United States Patent
Mazukabzov et al.

(10) Patent No.: US 11,693,827 B2
(45) Date of Patent: Jul. 4, 2023

(54) SYNCING AND PROPAGATION OF METADATA CHANGES ACROSS MULTIPLE ENDPOINTS

(71) Applicant: Microsoft Technology Licensing, LLC, Redmond, WA (US)

(72) Inventors: Alexander Yuryevich Mazukabzov, Redmond, WA (US); Rayyan Jaber, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1109 days.

(21) Appl. No.: 15/394,308

(22) Filed: Dec. 29, 2016

(65) Prior Publication Data
US 2018/0189316 A1 Jul. 5, 2018

(51) Int. Cl.
*G06F 16/178* (2019.01)
*H04L 67/1095* (2022.01)
*G06F 16/28* (2019.01)
*G06F 16/23* (2019.01)
*H04L 67/10* (2022.01)
*H04L 67/1097* (2022.01)

(52) U.S. Cl.
CPC ........ *G06F 16/178* (2019.01); *G06F 16/2379* (2019.01); *G06F 16/282* (2019.01); *H04L 67/10* (2013.01); *H04L 67/1095* (2013.01); *H04L 67/1097* (2013.01)

(58) Field of Classification Search
CPC .. G06F 16/178; G06F 16/2379; G06F 16/282; H04L 67/10; H04L 67/1095; H04L 67/1097
See application file for complete search history.

(56) References Cited

U.S. PATENT DOCUMENTS

| | | | |
|---|---|---|---|
| 6,086,642 A | 7/2000 | Fukaumi et al. | |
| 6,377,957 B1 | 4/2002 | Jeyaraman | |
| 6,446,077 B2 | 9/2002 | Straube et al. | |
| 6,996,682 B1 | 2/2006 | Milligan et al. | |
| 7,051,064 B1 | 5/2006 | Yamagishi et al. | |
| 7,620,646 B1 * | 11/2009 | Chai .................. | G06F 16/13 |

(Continued)

FOREIGN PATENT DOCUMENTS

| | | |
|---|---|---|
| EP | 1578126 A2 | 9/2005 |
| WO | 2004088664 A2 | 10/2004 |

OTHER PUBLICATIONS

Brandt, et al., "Efficient Metadata Management in Large Distributed Storage Systems", In Proceedings of 20th IEEE / 11th NASA Goddard Conference on Mass Storage Systems and Technologies, Apr. 2003, pp. 1-9.

*Primary Examiner* — Vaishali Shah

(57) ABSTRACT

Aspects of the present disclosure relate to systems and methods for syncing and propagating updated metadata across multiple endpoints. In one aspect, a request is sent from a client computing device to a service for updated metadata of a dataset. When updated metadata is identified at the service, updated metadata associated with a parent node of the dataset may be received at the client computing device without requiring the service to send updated metadata for one or more children nodes in the dataset. store the updated metadata associated with the parent node of the dataset may be stored in a local data store at the client computing device.

20 Claims, 8 Drawing Sheets

(56) References Cited

U.S. PATENT DOCUMENTS

| | | | |
|---|---|---|---|
| 7,689,901 B2 | 3/2010 | Risin et al. | |
| 8,620,861 B1* | 12/2013 | Uhrhane | G06F 16/1873 |
| | | | 707/610 |
| 9,015,243 B1 | 4/2015 | Queru | |
| 2005/0228798 A1* | 10/2005 | Shepard | H04L 67/34 |
| 2005/0256907 A1 | 11/2005 | Novik et al. | |
| 2010/0161657 A1 | 6/2010 | Cha et al. | |
| 2012/0151250 A1* | 6/2012 | Saika | G06F 11/1417 |
| | | | 714/4.11 |
| 2013/0036205 A1 | 2/2013 | Kaseno et al. | |
| 2014/0074783 A1 | 3/2014 | Alsina et al. | |
| 2014/0267380 A1* | 9/2014 | Letts | G06T 11/60 |
| | | | 345/619 |
| 2014/0283070 A1* | 9/2014 | Lewis | H04L 63/1433 |
| | | | 726/23 |
| 2015/0149956 A1* | 5/2015 | Kempinski | G06F 3/013 |
| | | | 715/784 |
| 2015/0150032 A1* | 5/2015 | Birnkrant | H04N 21/4668 |
| | | | 725/12 |
| 2015/0177940 A1* | 6/2015 | Trevino | H04L 67/02 |
| | | | 715/716 |
| 2017/0039233 A1* | 2/2017 | Gauthier | G06Q 10/067 |
| 2017/0134326 A1* | 5/2017 | Laporta | H04L 51/22 |
| 2018/0210950 A1* | 7/2018 | Zuckerman | H04L 67/1097 |

* cited by examiner

SYNCING AND PROPAGATION OF METADATA CHANGES ACROSS MULTIPLE ENDPOINTS

BACKGROUND

When syncing metadata of large hierarchical datasets, delta sync technology may be used. In current delta sync technology, a client may send a request for data and maintain a sync state such that the client queries for the next set of data that has occurred since the last sync operation. The server receiving the request for data may respond with a set of items that have changed along with new data. However, in a large hierarchical dataset a huge collection of items will need to be updated. Current delta sync technology requires that all data items and updates be transmitted across endpoints. In this regard, current delta sync technology requires significant resources on the server side and bandwidth, and is time consuming for the client.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for syncing and propagating updated metadata across multiple endpoints. In one aspect, a request is sent from a client computing device to a service for updated metadata of a dataset. When updated metadata is identified at the service, updated metadata associated with a parent node of the dataset may be received at the client computing device without requiring the service to send updated metadata for one or more children nodes in the dataset. store the updated metadata associated with the parent node of the dataset may be stored in a local data store at the client computing device.

In another aspect, a method for propagating updated metadata at a client computing device is presented. An indication of interest made with respect to a parent node of a dataset may be received. In response to receiving the indication of interest made with respect to the parent node, one or more children nodes of the parent node may be traversed. While the one or more children nodes of the parent node are traversed: metadata associated with the parent node of the dataset stored in a local data store at the client computing device may be identified, when metadata associated with the one or more children nodes of the parent node requires an update, the metadata associated with the one or more children nodes stored in the local data store may be updated, and the updated metadata associated with the one or more children nodes may be applied to the one or more children nodes.

In further aspects, an application embodied at least in part in program instructions stored on one or more computer readable storage media may comprise: a parent node in a user interface through which to, in response to receiving an indication of interest made with respect to the parent node, send a request to a service for updated metadata of a hierarchical dataset. The application may further comprise a local data store through which to receive updated metadata associated with the parent node without requiring the service to send updated metadata associated with one or more children nodes of the parent node. The application may further comprise one or more children nodes of the parent node in the user interface through which to propagate the updated metadata associated with the parent node.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
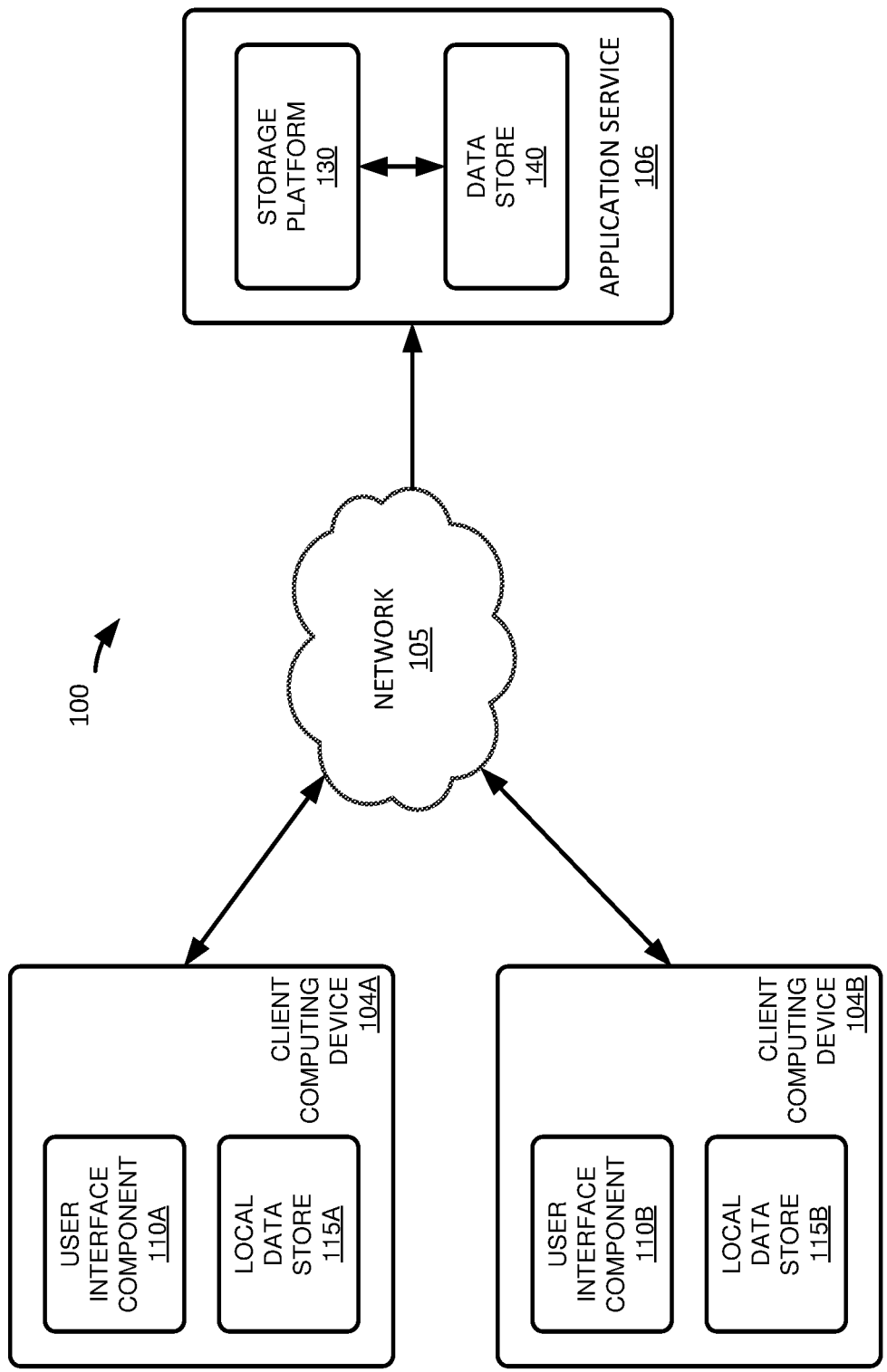
FIG. 1 illustrates an exemplary syncing and propagation system, according to an example aspect.

Aspects of the disclosure are generally directed to syncing and propagating metadata changes across multiple endpoints. For example, a client computing device may send a request to an application service for updated metadata associated with a dataset. The dataset may be a hierarchical dataset where items/data within the hierarchical dataset are impacted by changes that occur to a parent node of the hierarchical dataset. The items/data that are impacted by changes that occur to a parent node of the hierarchical dataset may inherit metadata from its parent. In this regard, changes made to a parent of the hierarchy propagate to all the children of the parent. The technology of the present disclosure propagates these changes made to a parent of a hierarchical dataset to the children of the parent at the client computing device and without requiring the transmission of all updated and/or inherited items/data across multiple endpoints.

As discussed above, in current delta sync technology, a client may send a request for data and maintain a sync state such that the client queries for the next set of data that has occurred since the last sync operation. The server receiving the request for data may respond with a set of items that have changed along with new data. However, in a large hierarchical dataset a huge collection of items will need to be updated. Current delta sync technology requires that all data items and updates be transmitted across endpoints. In this regard, current delta sync technology requires significant resources on the server side and bandwidth, and is time consuming for the client. Accordingly, aspects described herein include syncing and propagating updated metadata across endpoints at a client computing device. As discussed above, a client computing device may send a request to an application service for updated metadata associated with a dataset. When updated metadata (e.g., changes in metadata) is identified at the application service, the updated metadata associated with a parent node of the dataset may be received by the client computing device without requiring the application service to send updated metadata for one or more children nodes in the dataset. The updated metadata associated with the parent node may be stored in a local data store at the client computing device. In this regard, updated metadata associated with the parent node may be propagated to the children nodes at the client computing device. In contrast, delta sync operations described in the prior art herein require sending updated metadata for all the items/data/nodes in a hierarchical dataset in response to a request for updated metadata.

In aspects, when updated metadata associated with the parent node is stored in the local data store at the client computing device, one or more children nodes of the parent node in the local data store may be updated with the updated metadata associated with the parent node. In this regard, the children nodes of the parent node may inherit the metadata changes that have occurred to the parent node at the client computing device (e.g., the metadata changes associated with the parent node are propagated to the children nodes in the hierarchical dataset). In some cases, when updated metadata is not identified at the application service, metadata associated with the parent node of a hierarchical dataset may be identified in the local data store. The children nodes of the parent nodes may be checked to determine whether the children nodes require updating of metadata. The metadata associated with the children nodes may be updated in the local data store such that any metadata properties inherited by the children nodes match the metadata of the corresponding parent node. In this regard, in response receiving a selection of a parent node (e.g., a parent in a hierarchical folder structure in a user interface), updated metadata (e.g., changes) may be applied (e.g., propagated) to children in a hierarchical dataset at the client computing device (e.g., without requiring the updated metadata inherited by the children be sent/transmitted over a network, for example).

As such, the technology of the present disclosure facilitates syncing metadata changes in large datasets in such a way that metadata changes can be propagated to children in the dataset in an efficient manner. In this regard, a technical effect that may be appreciated is that syncing metadata changes in large datasets in such a way that metadata changes can be propagated to children in the dataset in an efficient manner facilitates a compelling visual and functional experience to allow users to efficiently view and interact with a user interface to quickly, easily, and efficiently view and interact with a hierarchical dataset. Another technical effect that may be appreciated is that by transmitting updated metadata associated with a parent in a hierarchical dataset without requiring transmission of updated metadata of all the children that inherit the updated metadata, processor load may be reduced, memory may be conserved, and network bandwidth usage may be reduced.

Referring now to the drawings, in which like numerals represent like elements through the several figures, aspects of the present disclosure and the exemplary operating environment will be described. With reference to FIG. 1, one aspect of a syncing and propagation system 100 for syncing and propagating updated metadata across multiple endpoints is illustrated. In aspects, the syncing and propagation system 100 may include a client computing devices 104A-104B and an application service 106. In a basic configuration, the client computing devices 104A-104B may be a handheld computer having both input elements and output elements. The client computing devices 104A-104B may be any suitable computing device for implementing the syncing and propagation system 100 for syncing and propagating updated metadata across multiple endpoints. For example, the client computing devices 104A-104B may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing devices 104A-104B for implementing the syncing and propagation system 100 for syncing and propagating updated metadata across multiple endpoints may be utilized.

In aspects, the application service 106 may provide data to and from the client computing devices 104A-104B through a network 105. In aspects, the syncing and propagation system 100 may be implemented on more than one application service 106, such as a plurality of application service 106. As discussed above, the application service 106 may provide data to and from the client computing devices 104A-104B through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera)

functionality for capturing and interpreting user gestures for controlling the functionality of the computing device, and the like.

As discussed above, the syncing and propagation system 100 may include client computing devices 104A-104B and an application service 106. The various components may be implemented using hardware, software, or a combination of hardware and software. The syncing and propagation system 100 may be configured to sync and propagate updated metadata in a hierarchical dataset across multiple endpoints. In this regard, updated metadata may be synced and propagated across the client computing devices 104A-104B. In one example, metadata may include information about data (e.g., items, files, etc.) such as a name, size, timestamp, hash, type of activity (e.g., edit, delete, creation), and the like. In another example, metadata may include information about data such as themes, permission settings, and the like. In some examples, the metadata such as themes, permission settings, and the like, may be metadata inherited by all children of a parent in a hierarchical dataset. For example, metadata inherited by all children of a parent in a hierarchical dataset may include the items, files, etc., within the hierarchical dataset that are impacted by a metadata change on a parent in the hierarchical dataset. A hierarchical dataset may include a hierarchy of items, files, etc., including one or more parent nodes and one or more children nodes. In some examples, a child node of a first parent node may be a second parent node to other children nodes within the hierarchy. That is, a child node may serve as both a child node and a parent node in the hierarchy and a parent node may serve as both a parent node and child node in the hierarchy.

In aspects, the themed metadata may include themes such as color, pattern, shape, and the like. For example, when the metadata of a parent node in a hierarchical dataset includes the color blue, all children of the parent node may inherit the color blue. In this regard, in one example, if the parent node is a blue folder in a hierarchical folder tree, all children folders of the parent folder in the hierarchical folder tree will be blue through inheritance from the parent folder. In examples, the permission settings metadata may include permissions associated with a user or multiple users of the hierarchical dataset. For example, the permission settings may include edit rights, read-only rights, view-only rights, file creator, file ownership, and the like. In this regard, in one example, if a parent folder has view-only rights associated with it, all children folders of the parent folder may inherit metadata including view-only rights. In another example, the metadata of a child node in a hierarchical dataset may be explicit. For example, a user may explicitly set a metadata property associated with a child node. In this regard, the child node may include both the explicit metadata (e.g., a metadata property explicitly set for a child node) and the metadata inherited from the parent node. In one example, if edit rights are explicitly set on a child folder and the parent folder has view rights associated with it, the child folder may include edit rights and view rights inherited from the parent node.

As illustrated in FIG. 1, the client computing devices 104A-104B include user interface components 110A-110B. In some examples, the user interface components 110A-110B may be configured to display an application for accessing and/or interacting with a dataset, for example. In one example, an application may include any application suitable for accessing datasets such as collaboration applications, email applications, chat applications, voice applications, and the like. In one example, a collaboration application may include an application such as a OneDrive application and a SharePoint application. In one case, items and/or files associated with the application and included in the dataset may include items and/or files such as word documents, spreadsheets, electronic slide presentations, emails, chat conversations, media files, and the like.

In another example, the user interface component 110 may display a plurality of nodes within an application. The plurality of nodes may correspond to a hierarchical dataset, as described herein. For example, the plurality of nodes may include a plurality of folders (e.g., a folder tree) for locating and organizing the items and/or files of the dataset. As discussed herein, the plurality of nodes may include one or more parent nodes and one or more children nodes. In this regard, in response to receiving an indication of interest made with respect to a parent node of the dataset, one or more children nodes may be displayed within the application in the user interface. In one example, an indication of interest may include touching, clicking on, audibly referencing, pointing to, selecting, and/or any indication of an interest in or selection of the parent node of the dataset.

As illustrated in FIG. 1, the client computing devices 104A-104B include local data stores 115A-115B. The local data stores 115A-115B may be configured to store metadata associated with a hierarchical dataset. For example, the local data stores 115A-115B may store metadata associated with one or more parent node and one or more children nodes of a hierarchical dataset. In one example, the local data stores 115A-115B include an SQL database. In one example, in response to receiving an indication of interest made with respect to a parent node of a dataset, one or more children nodes of the parent node may be traversed. For example, a first level subset of children nodes of the parent node may be identified. The first level subset of children nodes may include the nodes directly below the parent node in the hierarchical dataset. In some examples, while the one or more children nodes of the parent node are traversed, metadata associated with the parent node of the dataset stored in a local data store (e.g., local data stores 115A-115B) at a client computing device (e.g., client computing devices 104A-104B) may be identified. In one example, when metadata associated with the one or more children nodes of the parent node requires an update, the metadata associated with the one or more children nodes stored in the local data store (e.g., local data stores 115A-115B) may be updated. In this regard, while the one or more children nodes of the parent node are traversed (e.g., in response to an indication of interest made with respect to the parent node), the updated metadata associated with the one or more children nodes may be applied to the one or more children nodes.

In some examples, before metadata associated with the parent node of the dataset stored in local data stores 115A-115B is identified, a request for updated metadata of the dataset may be sent to the application service 106. When updated metadata is identified at the application service 106, the application service 106 may send only the updated metadata associated with a parent node of the dataset to the client computing device requesting the updated metadata. In this regard, the application service 106 is not required to send updated metadata for one or more (e.g., any) children in the dataset. For example, the application service 106 is not required to send updated metadata for every item and/or file in the dataset. The local data store at the client computing device requesting the updated metadata may receive and store the updated metadata associated with the parent node sent by the application service 106. In this regard, a change made to the dataset at the client computing device 104A may be synced with and consumed by the client computing device 104B, and vice versa, in an efficient manner; ultimately resulting in reducing processor load, conserving memory, and reducing network bandwidth.

In one example, the user interface components 110A-110B may be a touchable user interface that is capable of receiving input via contact with a screen of the client computing devices 104A-104B, thereby functioning as both an input device and an output device. For example, content may be displayed, or output, on the screen of the client computing devices 104A-104B and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface components 110A-110B may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing devices 104A-104B, thereby functioning as both an input device and an output device. For example, content may be displayed, or output, on the screen of the client computing devices 104A-104B and input may be received by contacting the screen using a cursor, for example. In this regard, contact may include, for example, placing a cursor on the non-touchable user interface using a device such as a mouse.

In some aspects, the application service 106 may include a storage platform 130 and a data store 140. In one example, the storage platform 130 may be configured to store, manage, and access data and/or information associated with the syncing and propagation system 100. For example, the storage platform 130 may store one or more items, files and/or metadata and/or updated metadata associated with a dataset in a data store 140. In one example, data store 140 may be part of and/or located at the storage platform 130. In another example, data store 140 may be a separate component and/or may be located separate from the storage platform 130. It is appreciated that although one application service 106 is illustrated in FIG. 1, the syncing and propagation system 100 may include a plurality of application services 106 with a plurality of storage platforms 130 and a plurality of data stores 140. In some cases, the application service 106 may include a plurality of storage platforms 130 and a plurality of data stores 140. For example, the plurality of storage platforms 130 may include at least file storage providers, external activity services and document editing clients. In one example, the storage platform 130 and/or the application service 106 may be cloud storage services such as OneDrive, SharePoint, Google Drive, Dropbox, and the like.

The examples described herein are exemplary only and should not be considered as limiting. For example, while various datasets, items, files, applications, and metadata are described herein, it is appreciated that any number of datasets, items, files, applications, and metadata for efficiently syncing and propagating metadata across multiple endpoints. Furthermore, any combination of the datasets, items, files, applications, and metadata described herein may be used for efficiently syncing and propagating metadata across multiple endpoints.

Figure 2:
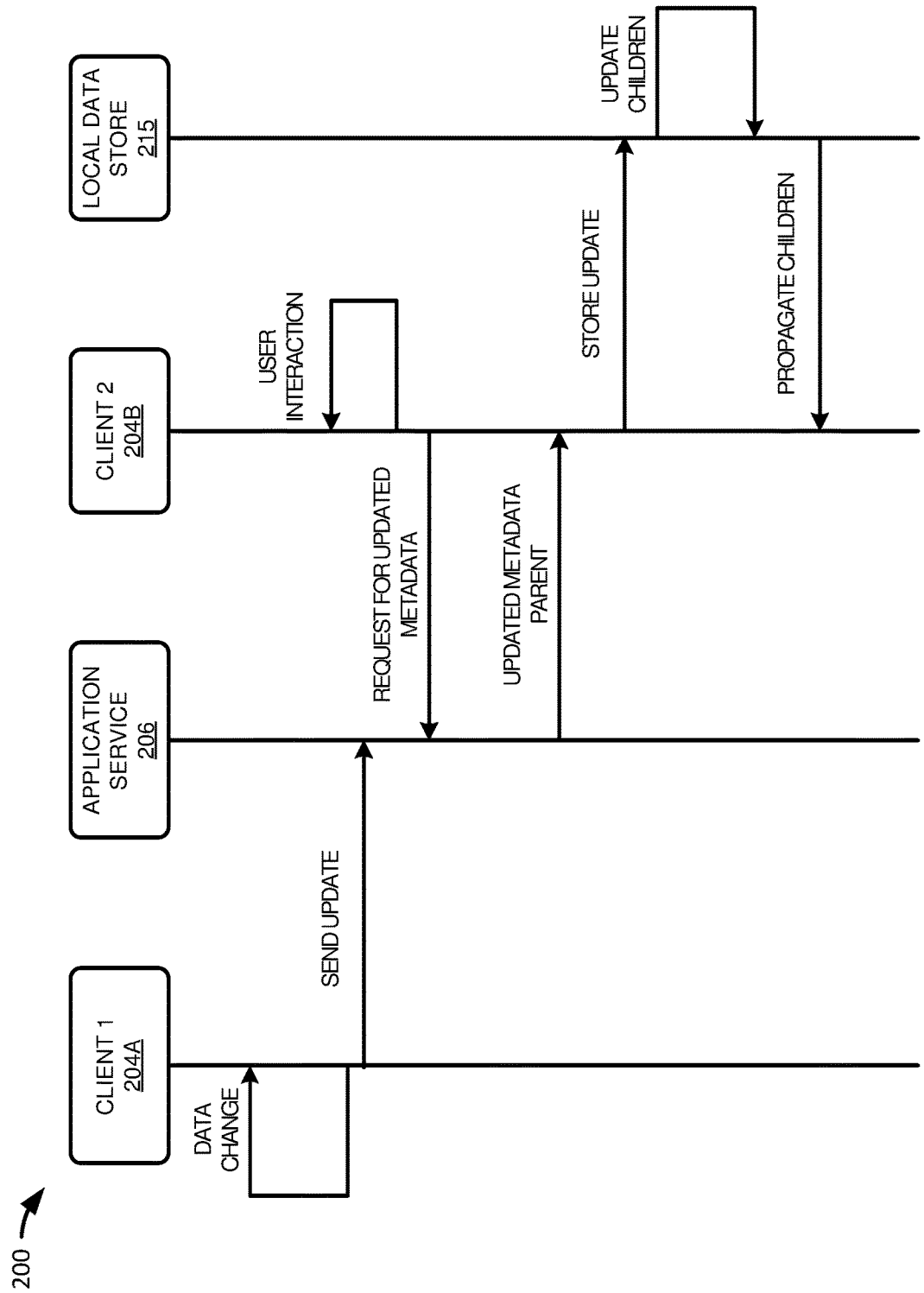
FIG. 2 illustrates a sequence diagram for syncing and propagating updated metadata across multiple endpoints, according to an example aspect.

FIG. 2 illustrates a sequence diagram 200 for syncing and propagating updated metadata across multiple endpoints, according to an example aspect. The sequence diagram 200 includes a first client 204A, a second client 204B, an application service 206, and a local data store 215. In a first phase, when a metadata change to an item, file, folder, etc. of a dataset is made at the first client 204A, the change/update to the metadata may be sent to the application service 206. The application service 206 stores the change/update to the metadata. In a second phase, a user of the second client 204B interacts with the dataset including the metadata that changed from the first phase and that is stored at the application service 206. In response to the interaction with the dataset (e.g., in response to an indication of interest made with respect to a node of the dataset at the second client 204B), a request for updated metadata is sent to the application service 206. The request for updated metadata may include a request for the metadata associated with the dataset that has changed since a last request for metadata was sent by the second client 204B. In response to receiving the request for updated metadata, the application service 206 sends only the updated metadata associated with the parent node of the dataset (e.g., the node that received the indication of interest from the user). When the second client 204B receives the updated metadata associated with the parent node of the dataset, the second client 204B stores the updated metadata in the local data store 215 at the second cline 204B. The second client 204B updates the children associated with the parent node in the local data store 215 with the updated metadata associated with the parent node. In this regard, the children that inherit the metadata that changed in the parent get updated without requiring the application service 206 to send all the updated metadata properties inherited by the children in the dataset. When the children get updated in the local data store 215, the updated metadata may be propagated to the children as they are displayed in a user interface of the second client 204B, which will be illustrated below relative to FIGS. 3A-3B.

Figure 3A:
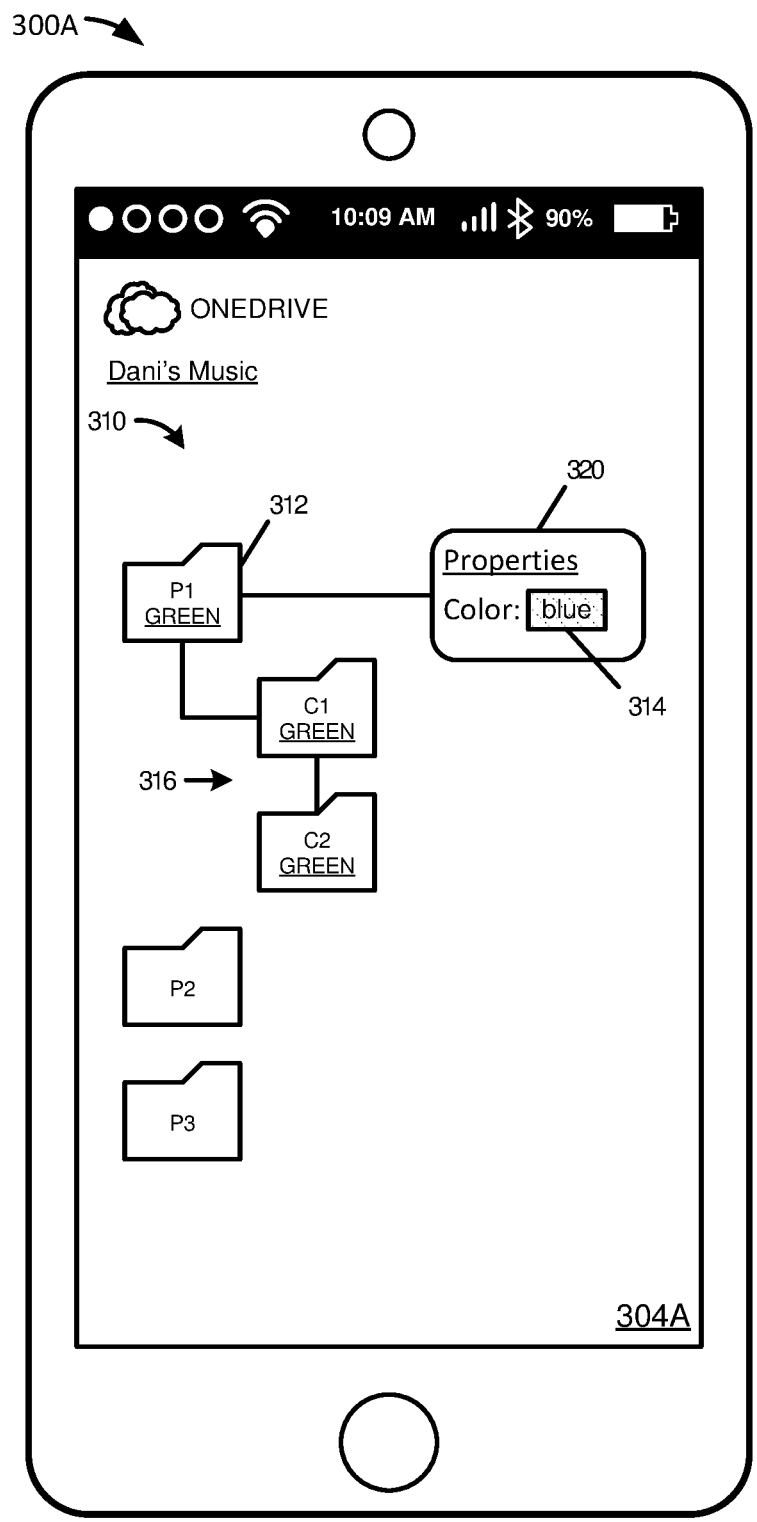
FIG. 3A illustrates one view of a collaboration application displayed on a user interface of a client computing device, according to an example aspect.

FIG. 3A illustrates one view 300A of a collaboration application displayed in a user interface of a client computing device 304A (e.g., such as client computing devices 104A-104B), according to an example aspect. The exemplary client computing device 304A, as shown in FIG. 3A, is a mobile phone. The exemplary collaboration application, as shown in FIG. 3A, is OneDrive. As illustrated, the exemplary view 300A of the collaboration application includes a dataset 310. The dataset 310 illustrated in FIG. 3A includes a folder tree with parent nodes and children nodes. In particular, the parent nodes include parent node 312 and the children nodes of the parent node 312 include children nodes 316. As illustrated in FIG. 3A, the parent node 312 is green (e.g., includes metadata of the color green) and the children nodes 316 are green. In one example, a user may change the metadata properties associated with the parent node 312. In this example, a properties icon 320 may be utilized to change at least some metadata properties associated with the parent node 312. In the example illustrated in FIG. 3A, a themed metadata property of color is changed from green to blue. As such, in response to a selection of the color property blue 314, the color of the parent node (e.g., folder) 312 may change to blue.

Figure 3B:
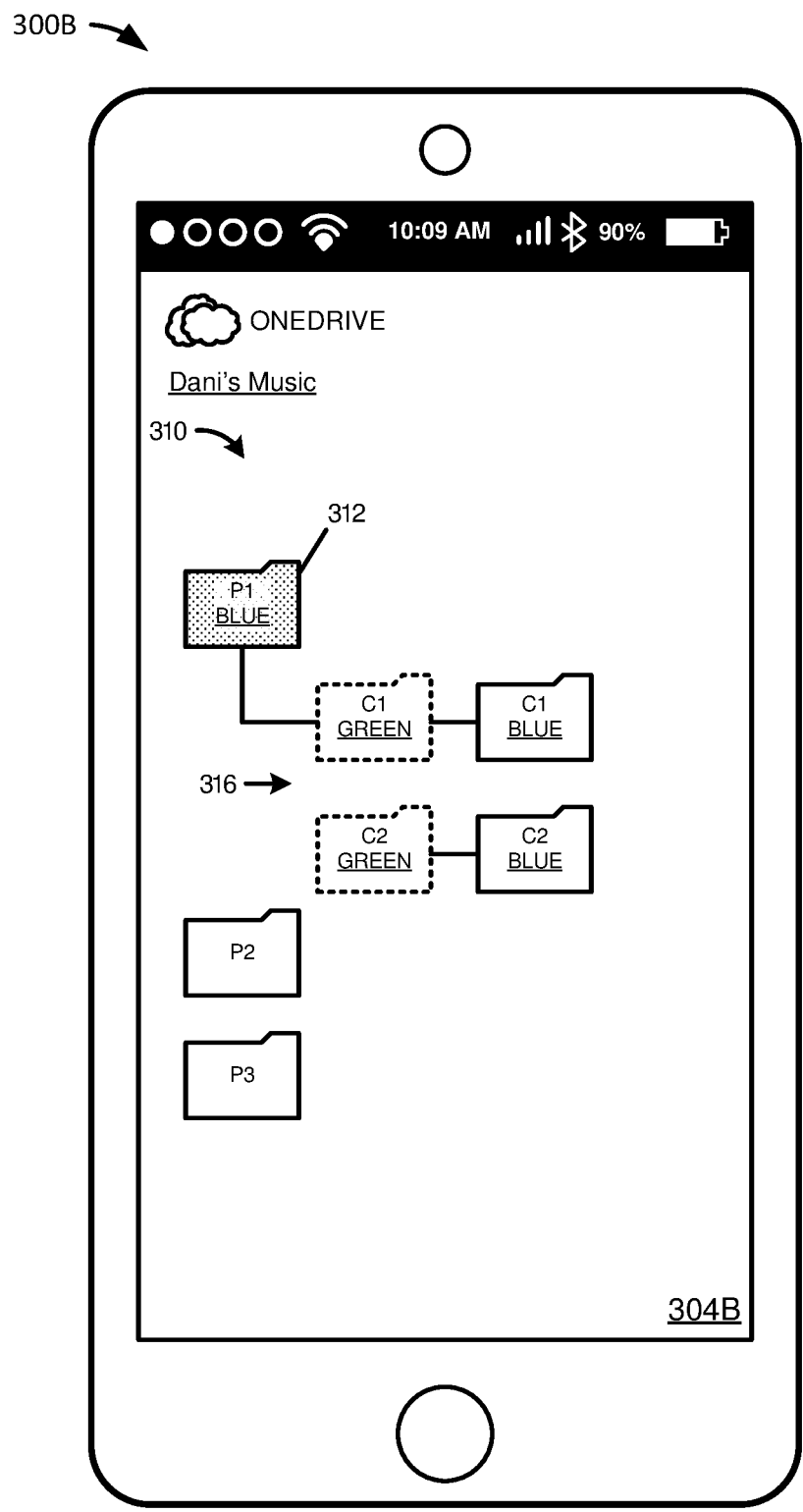
FIG. 3B illustrates one view in a progression of views a collaboration application displayed on a user interface of a client computing device, according to an example aspect.

Referring now to FIG. 3B, one view 300B in a progression of views a collaboration application displayed on a user interface of a client computing device 304B (e.g., such as client computing devices 104A-104B) is illustrated, according to an example aspect. The exemplary client computing device 304B, as shown in FIG. 3B, is a mobile phone. The exemplary collaboration application, as shown in FIG. 3B, is OneDrive. As illustrated, the exemplary view 300B of the collaboration application includes the dataset 310 (e.g., the same dataset described relative to FIG. 3A). The dataset 310 illustrated in FIG. 3B includes the parent node 312 and the children nodes 316. In this regard, the dataset 310 may be accessed from and synced across multiple endpoints. As illustrated in FIG. 3B, the parent node 312 is blue. As such, FIG. 3B illustrates that the change from green to blue to the metadata associated with the parent node 312 is received at the client computing device 304B. The change/updated metadata may be stored at a local data store of the client computing device 304B, as described herein. In some examples, the change is received and available to a user of the client computing device 304B upon launching the collaboration application illustrated in FIG. 3B.

As illustrated in FIG. 3B, the metadata associated with the children nodes 316 before an indication of interest made with respect to the parent node 312 is received, has not been updated. That is, the children nodes (e.g., folders) 316 are green. In response to receiving an indication of interest made with respect to the parent node (e.g., folder) 312, the children nodes 316 are traversed. While the children nodes 316 are traversed, as described herein, the metadata associated with the parent node 312 may be identified in a local data store at the client computing device 304B. When the metadata associated with the children nodes 316 of the parent node 312 requires an update, the metadata associated with the children nodes 316 may be updated. In this regard, the color metadata of the children nodes 316 is updated from green to blue (e.g., in the local data store at the client computing device 304B). As illustrated in FIG. 3B, the updated metadata (e.g., green to blue) associated with the children nodes 316 is applied to the children nodes 316. In this regard, the children nodes 316 are displayed within the collaboration application in the user interface of the client computing device 304B with the color blue. That is, the metadata associated with the parent node 312 is propagated to the children nodes 316 at the time of traversal at the client computing device 304B. In the example illustrated in FIG. 3B, the children nodes 316 are a first level subset of children of the parent node 312.

Figure 3C:
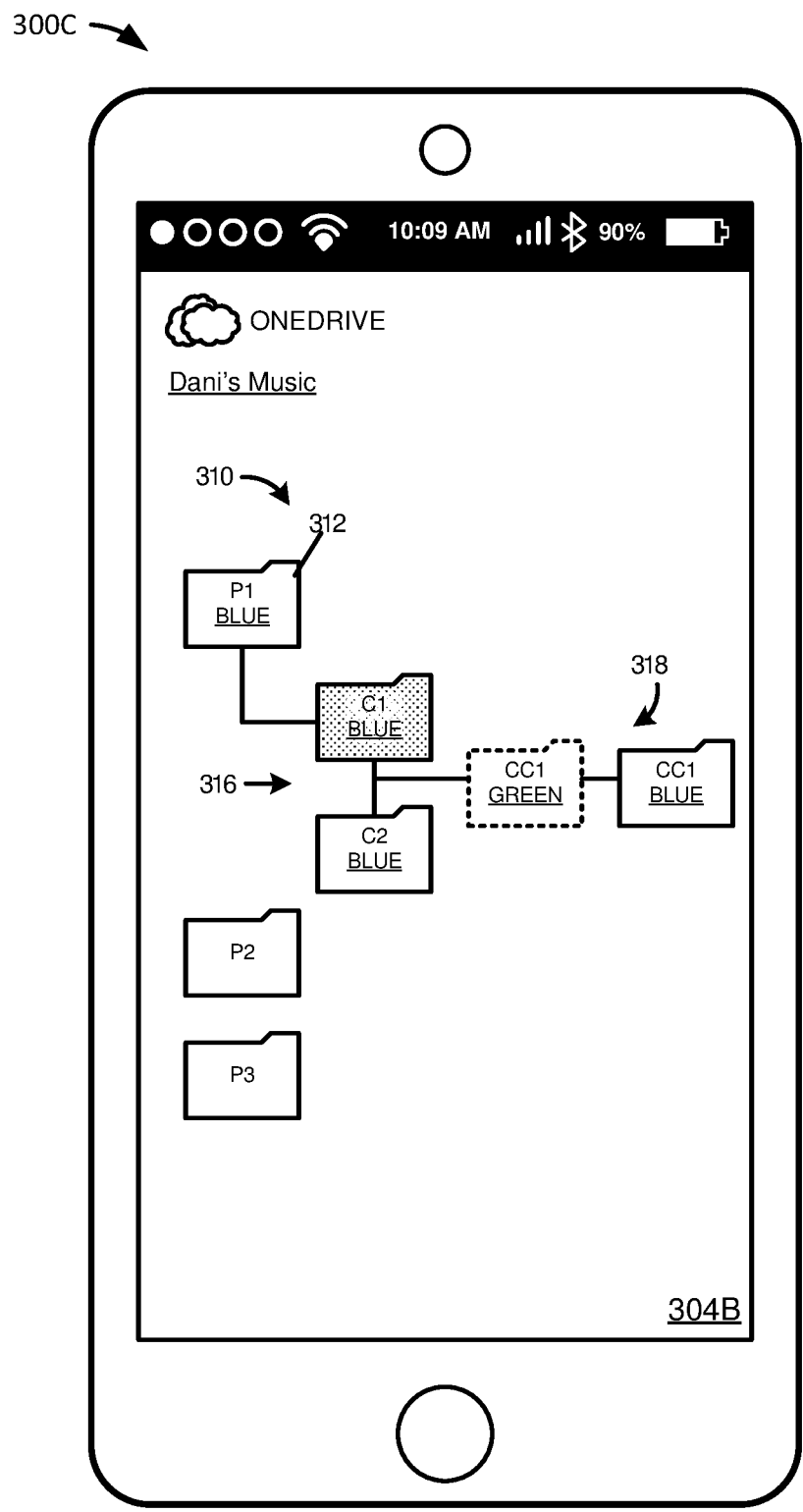
FIG. 3C illustrates another view in a progression of views of the collaboration application of FIG. 3B, according to an example aspect.

Referring now to FIG. 3C another view 300C in a progression of views of the collaboration application displayed on a user interface of the client computing device 304B (e.g., such as client computing devices 104A-104B) is illustrated, according to an example aspect. The exemplary collaboration application, as shown in FIG. 3C, is OneDrive. As illustrated, the exemplary view 300C of the collaboration application includes the dataset 310 (e.g., the same dataset described relative to FIGS. 3A-3B). The dataset 310 illustrated in FIG. 3C includes the parent node 312, the children nodes 316 (e.g., a first level), and a second level of children nodes 318. The second level of children nodes 318 may be accessed by receiving an indication of interest made with respect to the first level of children nodes 316. In this example, the first level of children nodes 316 (e.g., C1) are parent nodes to the second level of children nodes 318. In this regard, in one example, the second level of children nodes 318 may inherit metadata changes that occur to the first level of children nodes 316.

As illustrated in FIG. 3C, the metadata associated with the second level of children nodes 318 before an indication of interest made with respect to the child node (C1) 316 is received, has not been updated. That is, the child node (CC1) 318 is green. In response to receiving an indication of interest made with respect to the child node 316 (C1), the child node (CC1) 318 is traversed. While the child node 318 is traversed, as described herein, the metadata associated with the child node C1 (e.g., a parent node to child node 318) may be identified in a local data store at the client computing device 304B. When the metadata associated with the child node 318 requires an update, the metadata associated with the child node 318 may be updated. In this regard, the color metadata of the child node 318 is updated from green to blue (e.g., in the local data store at the client computing device 304B). As illustrated in FIG. 3C, the updated metadata (e.g., green to blue) associated with the child node 318 is applied to the child node 318. In this regard, the child node 318 is displayed within the collaboration application in the user interface of the client computing device 304B with the color blue. That is, the metadata associated with the parent node 312 and the first level of child node C1 is propagated to the child node 318 at the time of traversal at the client computing device 304B.

It is appreciated that while FIGS. 3A-3B illustrate various views of a collaboration application, dataset 310, parent node 312, children nodes 316, children nodes 318, and color metadata properties, the various views of the collaboration application, dataset 310, parent node 312, children nodes 316, children nodes 318, and the color metadata properties is exemplary only and should not be considered as limiting. Any suitable number and/or type of applications, files, datasets, parent nodes, children nodes, and metadata properties may be utilized in conjunction with the present disclosure.

Figure 4:
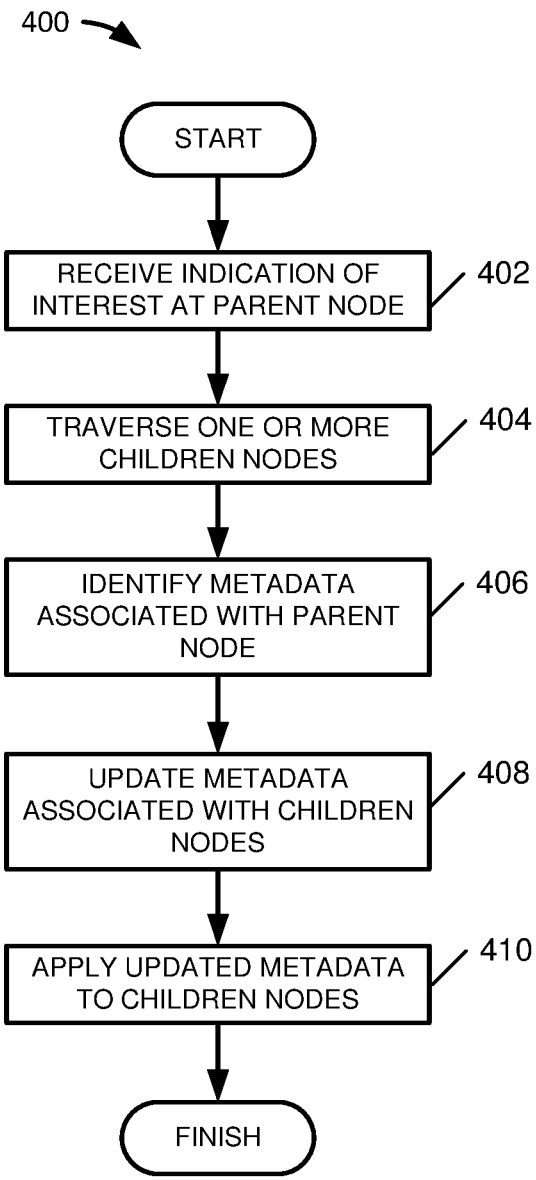
FIG. 4 illustrates an exemplary method for propagating updated metadata at a client computing device, according to an example aspect.

Referring now to FIG. 4, an exemplary method 400 for propagating updated metadata at a client computing device, according to an example aspect is shown. Method 400 may be implemented on a computing device or a similar electronic device capable of executing instructions through at least one processor. Method 400 may begin at operation 402, where an indication of interest made with respect to a parent node of a dataset is received. In one example, an indication of interest may include touching, clicking on, audibly referencing, pointing to, selecting, and/or any indication of an interest in or selection of the parent node of the dataset. The dataset may be a hierarchical dataset where items/data within the hierarchical dataset are impacted by changes that occur to a parent node of the hierarchical dataset. The items/data that are impacted by changes that occur to a parent node of the hierarchical dataset may inherit metadata from its parent. In one example, the parent node includes a parent folder of the hierarchical dataset and one or more children nodes include one or more children folders of the parent folder.

In response to receiving the indication of interest made with respect to the parent node of the dataset, flow proceeds to operation 404 where one or more children nodes of the parent node are traversed. For example, a first level subset of children nodes of the parent node may be identified. The first level subset of children nodes may include the nodes directly below the parent node in the hierarchical dataset. In some examples, as the one or more children nodes of the parent nodes are traversed, the one or more children nodes may inherit updated metadata changes from the parent node. In this regard, children nodes may inherit updated metadata changes from a parent node as an experience is consumed by a user (e.g., at each level of a hierarchical dataset). As such, each level of the hierarchical dataset is not traversed at the same time; ultimately resulting is a reduced processing load.

In some aspects, while the one or more children nodes of the parent node are traversed, operations 406, 408, and 410 may be performed. At operation 406, metadata associated with the parent node of the dataset stored in a local data store at the client computing device is identified. In one example, before metadata associated with the parent node of the dataset stored in a local data store at the client computing device is identified, a request may be sent from the client computing device to a service (e.g., an application service) for updated metadata of the dataset. When updated metadata is identified at the service, the updated metadata associated with the parent node of the dataset may be received at the client computing device without requiring the service to send updated metadata associated with the one or more children nodes of the parent node. When the updated metadata associated with the parent node of the dataset is received at the client computing device, the application and/or client computing device may store the updated metadata associated with the parent node of the dataset in the local data store at the client computing device. In one example, when no updated metadata is identified at the service, the metadata associated with the parent node of the dataset stored in the local data store at the client computing device is identified.

At operation 408 the metadata associated with the one or more children nodes stored in the local data store is updated when an update is required. In one example, the one or more children nodes of the parent node require an update when the metadata associated with the parent node of the dataset stored in the local data store does not match the metadata associated with the one or more children nodes of the parent nodes. The one or more children nodes may be updated in the local data store. In this regard, the updated metadata associated with the parent node of the dataset is inherited by the one or more children nodes of the parent node.

At operation 410 the updated metadata associated with the one or more children nodes is applied to the one or more children nodes. In one example, the one or more children nodes of the parent node are first level children nodes in a hierarchy of nodes of the dataset. In this regard, applying the updated metadata associated with the one or more children nodes to the one or more children nodes may include displaying the one or more children nodes in a user interface of the client computing device. In one example, the one or more children nodes are displayed in a hierarchical structure. In another example, the updated metadata applied to the one or more children nodes may be viewable while the one or more children nodes are displayed.

Figure 5:
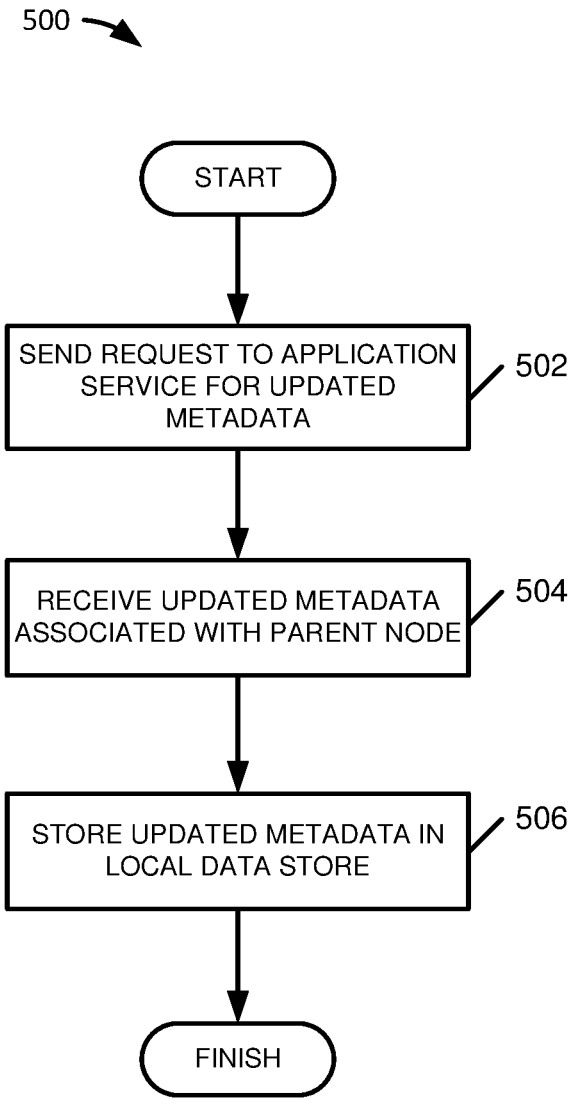
FIG. 5 illustrates an exemplary method for syncing updated metadata across multiple endpoints, according to an example aspect.

Referring now to FIG. 5, an exemplary method 500 for syncing updated metadata across multiple endpoints, according to an example aspect is shown. Method 500 may be implemented on a computing device or a similar electronic device capable of executing instructions through at least one processor. Method 500 begins at operation 502 where a request is sent from a client computing device to a service for updated metadata of a dataset. In one example, the service is an application service. In one example, the updated metadata includes metadata changes that occurred since a last request was sent to the service for updated metadata of the dataset. In this regard, the requested metadata includes the changes that have occurred in a dataset since a last syncing operation was performed. In one example, the updated metadata may include information about data (e.g., items, files, etc.) such as a name, size, timestamp, hash, type of activity (e.g., edit, delete, creation), and the like. In another example, metadata may include information about data such as themes, permission settings, and the like. In some examples, the metadata such as themes, permission settings, and the like, may be metadata inherited by all children of a parent in a hierarchical dataset. For example, metadata inherited by all children of a parent in a hierarchical dataset may include the items, files, etc., within the hierarchical dataset that are impacted by a metadata change on a parent in the hierarchical dataset.

When a request is sent from a client computing device to a service for updated metadata of a dataset, flow proceeds to operation 504 where updated metadata associated with a parent node of the dataset is received at the client computing device without requiring the service to send updated metadata for one or more children nodes in the dataset. In one example, the updated metadata associated with a parent node of the dataset is received at the client computing device without requiring the service to send updated metadata for one or more children nodes in the dataset when updated metadata is identified at the service. In some examples, updated metadata may not be identified at the service (e.g., no metadata changes have occurred since the last sync operation was performed). In some examples, updated metadata associated with a parent node of the dataset may be received at the client computing device periodically. For example, the client computing device may send a request for updated metadata based on a time schedule (e.g., every hour, every day, every week, etc.). In another example, updated metadata associated with a parent node of the dataset may be received at the client computing device as an experience is consumed by a user (e.g., in response to receiving an indication of interest made with respect to the parent node in a user interface).

When updated metadata associated with a parent node of the dataset is received at the client computing device without requiring the service to send updated metadata for one or more children nodes in the dataset, flow proceeds to operation 506 where the updated metadata associated with the parent node of the dataset is stored in a local data store at the client computing device. The local data store may be configured to store metadata associated with one or more parent nodes and one or more children nodes of a hierarchical dataset. In one example, the local data store is an SQL database. The metadata associated with one or more children nodes of the parent node may be updated in the local data store with the updated metadata associated with the parent node received at the client computing device.

Figure 6:
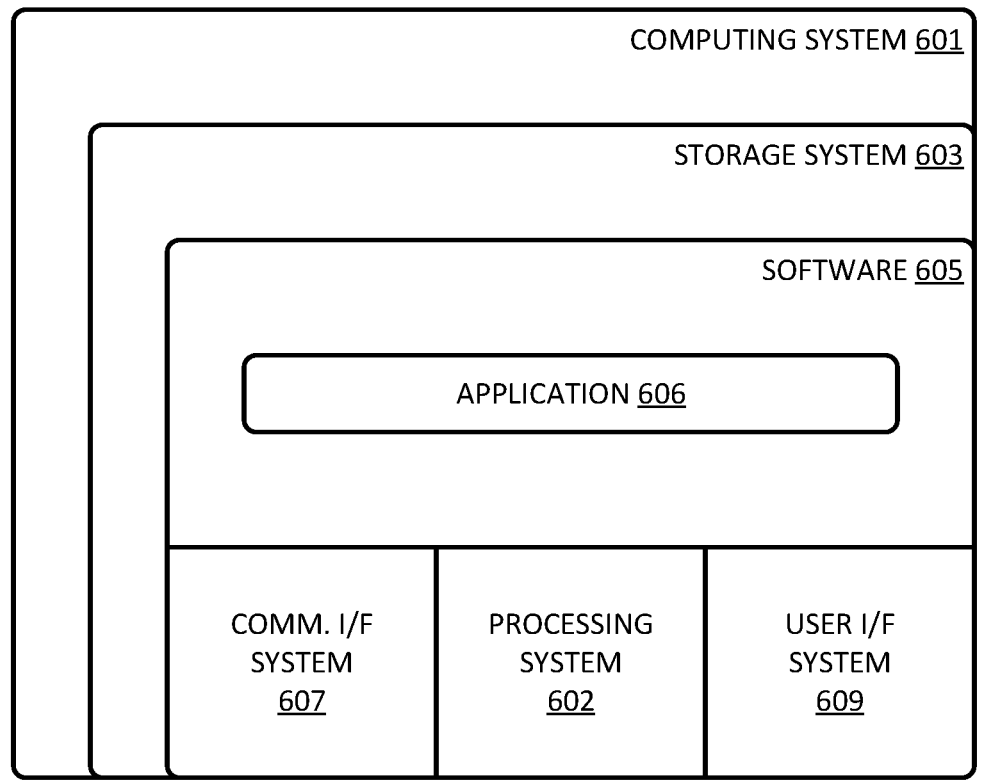
FIG. 6 illustrates a computing system suitable for implementing the enhanced metadata syncing and propagation technology disclosed herein, including any of the environments, architectures, elements, processes, user interfaces, and operational scenarios and sequences illustrated in the Figures and discussed below in the Technical Disclosure.

FIG. 6 illustrates computing system 601 that is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes application 606, which is representative of the applications discussed with respect to the preceding FIGS. 1-5. When executed by processing system 602 to enhance rendering of hosted webpages, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced metadata syncing and propagation systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include application 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced metadata syncing and propagation systems. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising one or more computer readable storage media; and program instructions stored on the one or more computer readable storage media that, when executed by at least one processor, cause the at least one processor to at least: send a request from a client computing device to a service for updated metadata of a dataset; when updated metadata is identified at the service: receive updated metadata associated with a parent node of the dataset without requiring the service to send updated metadata for one or more children nodes in the dataset; and store the updated metadata associated with the parent node of the dataset in a local data store at the client computing device. In further examples, to store the updated metadata associated with the parent node of the dataset in a local data store at the client computing device, the program instructions, when executed by the at least one processor, cause the at least one processor to update one or more children nodes of the parent node in the local data store with at least the updated metadata associated with the parent node of the dataset and updated metadata explicitly set for the one or more children nodes. In further examples, the program instructions, when executed by the at least one processor, further cause the at least one processor to apply the updated metadata associated with the parent node to the one or more children nodes. In further examples, the updated metadata comprises at least one of themes and permission settings. In further examples, the updated metadata associated with the parent node of the dataset is inherited by the one or more children nodes. In further examples, when no updated metadata is identified at the service, the program instructions, when executed by the at least one processor, further cause the at least one processor to traverse one or more children nodes of the parent node. In further examples, to traverse one or more children nodes of the parent nodes, the program instructions, when executed by the at least one processor, further cause the at least one processor to identify metadata associated with the parent node of the dataset stored in the local data store at the client computing device. In further examples, to traverse one or more children nodes of the parent nodes, the program instructions, when executed by the at least one processor, further cause the at least one processor to when metadata associated with the one or more children nodes of the parent node requires an update, update the metadata associated with the one or more children nodes stored in the local data store. In further examples, to traverse one or more children nodes of the parent nodes, the program instructions, when executed by the at least one processor, further cause the at least one processor to apply the updated metadata associated with the one or more children nodes to the one or more children nodes. In further examples, the updated metadata includes metadata changes that occurred since a last request was sent to the service for updated metadata of the dataset.

Further aspects disclosed herein provide an exemplary computer-implemented method for propagating updated metadata at a client computing device, the method comprising: receiving an indication of interest made with respect to a parent node of a dataset; in response to receiving the indication of interest made with respect to the parent node, traversing one or more children nodes of the parent node; and while traversing the one or more children nodes of the parent node: identifying metadata associated with the parent node of the dataset stored in a local data store at the client computing device; when metadata associated with the one or more children nodes of the parent node requires an update, updating the metadata associated with the one or more children nodes stored in the local data store; and applying the updated metadata associated with the one or more children nodes to the one or more children nodes. In further examples, the computer-implemented method further comprises in response to applying the updated metadata associated with the one or more children nodes to the one or more children nodes, displaying the one or more children nodes in a user interface of the client computing device. In further examples, the computer-implemented method further comprises in response to receiving the indication of interest made with respect to the parent node and before traversing the one or more children nodes of the parent node: sending a request from the client computing device to a service for updated metadata of the dataset; and when updated metadata is identified at the service, receiving updated metadata associated with the parent node of the dataset without requiring the service to send updated metadata associated with the one or more children nodes of the parent node. In further examples, the computer-implemented method further comprises storing the updated metadata associated with the parent node of the dataset in the local data store at the client computing device. In further examples, the one or more children nodes of the parent node are first level children nodes in a hierarchy of nodes of the dataset. In further examples the one or more children nodes of the parent node require an update when the metadata associated with the parent node of the dataset stored in the local data store does not match the metadata associated with the one or more children nodes of the parent nodes. In further examples, the updated metadata associated with the parent node of the dataset is inherited by the one or more children nodes of the parent node.

Additional aspects disclosed herein provide an computing apparatus comprising: one or more computer readable storage media; and an application embodied at least in part in program instructions stored on the one or more computer readable storage media and comprising: a parent node in a user interface through which to, in response to receiving an indication of interest made with respect to the parent node, send a request to a service for updated metadata of a hierarchical dataset; a local data store through which to receive updated metadata associated with the parent node without requiring the service to send updated metadata associated with one or more children nodes of the parent node; and one or more children nodes of the parent node in the user interface through which to propagate the updated metadata associated with the parent node. In further examples, the local data store is configured to store the updated metadata associated with the parent node. In further examples, the parent node comprises a parent folder of the hierarchical dataset and the one or more children nodes comprise one or more children folders of the parent folder.

Techniques for syncing and propagating updated metadata across multiple endpoints are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of metadata syncing and propagation systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A client computing device comprising:
one or more computer readable storage media; and
program instructions stored on the one or more computer readable storage media that, when executed by at least one processor, cause the client computing device to synchronize and propagate updated metadata of a hierarchical dataset across multiple endpoints by directing the client computing device to at least:
subsequent to receiving the updated metadata, store the updated metadata in a local data store at the client computing device;
update a parent node of the hierarchical dataset using the updated metadata in the local data store and refrain from updating nodes below the parent node in the hierarchical dataset until a selection of the parent node or a selection of a node below the parent node;
responsive to the selection of the parent node, update a child node of the parent node using the updated metadata in the local data store; and
responsive to a selection of the child node, update a grandchild node using metadata of the child node, wherein the grandchild node is a child of the child node and a grandchild of the parent node.

2. The client computing device of claim 1, wherein the updated metadata comprises a display theme.

3. The client computing device of claim 1, wherein the program instructions, when executed by the at least one processor, further cause the client computing device to, subsequent to updating the child node, store, on the client computing device, the metadata of the child node.

4. The client computing device of claim 1, wherein the updated metadata comprises a permission setting.

5. The client computing device of claim 3, wherein the program instructions, when executed by the at least one processor, further cause the client computing device to, subsequent to updating the grandchild node, store, on the client computing device, metadata of the grandchild node.

6. The client computing device of claim 3, wherein the program instructions, when executed by the at least one processor, further cause the client computing device to enable display of the child node comprising the metadata of the child node.

7. The client computing device of claim 1, wherein the program instructions, when executed by the at least one processor, further cause the client computing device to identify the updated metadata in the local data store.

8. The client computing device of claim 1, wherein the selection of the parent node results from at least one of a touch input, a click input, an audible input, and a pointing input.

9. The client computing device of claim 1, wherein the updated metadata includes metadata changes that occurred since a last request was sent to a service for metadata of the hierarchical dataset.

10. A computer-implemented method for synchronizing and propagating updated metadata of a hierarchical dataset across multiple endpoints at a client computing device, the method comprising:
   subsequent to receiving at the client computing device updated metadata associated with a parent node of the hierarchical dataset, storing the updated metadata in a local data store at the client computing device;
   updating the parent node using the updated metadata in the local data store and refrain from updating nodes below the parent node in the hierarchical dataset until a selection of the parent node or a selection of a node below the parent node;
   in response to receiving at the client computing device, a selection of a parent node of the hierarchical dataset, updating a child node of the parent node using the updated metadata in the local data store; and
   responsive to a selection of the child node, update a grandchild node using metadata of the child node, wherein the grandchild node is a child of the child node and a grandchild of the parent node.

11. The computer-implemented method of claim 10, further comprising subsequent to updating the child node, displaying the child node with an expression of the updated metadata in a user interface of the client computing device.

12. The computer-implemented method of claim 10, further comprising in response to receiving the selection of the parent node, sending a request from the client computing device to a service for the updated metadata.

13. The computer-implemented method of claim 10, wherein the updated metadata comprises a permission setting.

14. The computer-implemented method of claim 10, further comprising, subsequent to updating the child node, storing, on the client computing device, the metadata of the child node.

15. The computer-implemented method of claim 14, further comprising, subsequent to updating the grandchild node, storing, on the client computing device, metadata of the grandchild node.

16. One or more non-transitory computer readable storage media comprising program instructions that, when read and executed by a processing system, direct the processing system to at least:
   receive updated metadata associated with a parent node of a hierarchical dataset;
   subsequent to receiving the updated metadata, store the updated metadata in a local data store at a client computing device;
   update the parent node using the updated metadata in the local data store and refrain from updating nodes below the parent node in the hierarchical dataset until a selection of the parent node or a selection of a node below the parent node;
   responsive to the selection of the parent node, update a child node of the parent node using the updated metadata in the local data store; and
   responsive to a selection of the child node, update a grandchild node using metadata of the child node, wherein the grandchild node is a child of the child node and a grandchild of the parent node.

17. The one or more non-transitory computer readable storage media of claim 16, wherein the program instructions, when read and executed by the processing system, further direct the processing system to, subsequent to updating the child node, displaying the child node with an expression of the updated metadata in a user interface of the client computing device.

18. The one or more non-transitory computer readable storage media of claim 16, wherein the program instructions, when read and executed by the processing system, further direct the processing system to, responsive to receiving the selection of the parent node, sending a request from the client computing device to a service for the updated metadata.

19. The one or more non-transitory computer readable storage media of claim 16, wherein the program instructions, when read and executed by the processing system, further direct the processing system to, subsequent to updating the child node, store, on the client computing device, the metadata of the child node.

20. The one or more non-transitory computer readable storage media of claim 19, wherein the program instructions, when read and executed by the processing system, further direct the processing system to, subsequent to updating the grandchild node, store, on the client computing device, metadata of the grandchild node.

* * * * *